United States Patent Office 3,485,852
Patented Dec. 23, 1969

3,485,852
6-HALO-6-DEHYDRO-PROGESTERONES
Howard J. Ringold, Shrewsbury, Mass., and Albert Bowers, Mexico City, Mexico, assignors to Syntex Corporation, Panama, Panama, a corporation of Panama
No Drawing. Continuation-in-part of applications Ser. No. 826,119, July 10, 1959, Ser. No. 25,238, Apr. 28, 1960, and Ser. No. 104,001, Apr. 19, 1961. This application Dec. 13, 1963, Ser. No. 330,234
Claims priority, application Mexico, July 10, 1959, 55,215; Nov. 13, 1958, 52,733
Int. Cl. C07c 169/34; A61k 17/06
U.S. Cl. 260—397.4
28 Claims This invention relates to novel cyclopentanopolyhydrophenanthrene derivatives and to processes for their preparation.

More particularly, this invention relates to novel 6-halo-$\Delta^{4,6}$-pregnadienes and 6-halo-$\Delta^{1,4,6}$-pregnatrienes represented by the general formula:

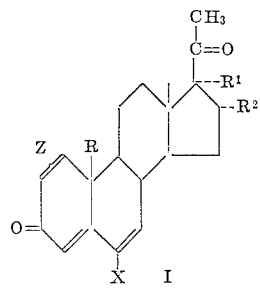

In this formula R and $R^2$ each represent either hydrogen or methyl, with R being methyl when $R^2$ is methyl; R' represents a hydroxyl group or an esterified hydroxyl group, i.e., an organic acyloxy or inorganic ester group, with R' being an esterified hydroxyl group when R is hydrogen or when $R^2$ is methyl; X represents fluorine, chlorine or bromine; Z represents either a saturated linkage or a double bond between the carbon atoms at the 1- and 2-positions, and when R is hydrogen, Z represents a saturated linkage between the carbon atoms at the 1- and 2- positions.

This application is a continuation-in-part of copending applications Ser. Nos. 826,119, filed July 10, 1959; 25,238, filed Apr. 28, 1960 now abandoned, and 104,001, filed Apr. 19, 1961 now abandoned.

The various compounds included in general Formula I hereinabove can also be represented by the following more specific formulas:

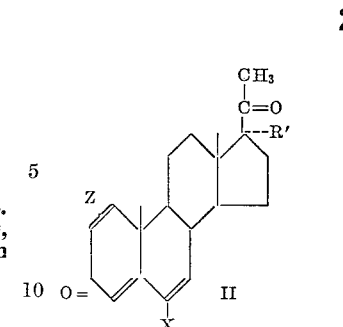
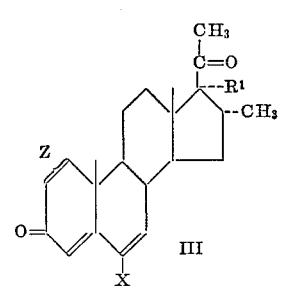
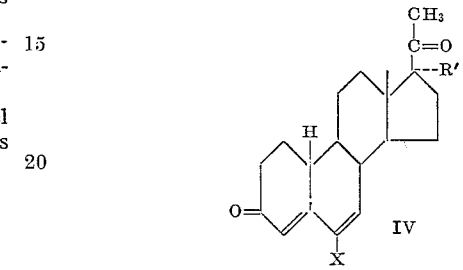

In these formulas R', X and Z have the same meaning as set forth hereinabove for Formula I.

The ester groups referred to herein are preferably derived from a hydrocarbon carboxylic acid having less than 12 carbon atoms. Such acyloxy groups can be saturated or unsaturated, straight or branched-chain aliphatic, cyclic or cyclic-aliphatic, or aromatic, and can also be either unsubstituted or substituted with one or more functional groups such as hydroxyl groups, acyloxy groups containing up to 12 carbon atoms, alkoxy groups containing up to 8 carbon atoms, nitro groups, amino groups and halogen atoms, e.g., fluorine, chlorine or bromine. Typical of such acyloxy groups are the acetoxy, aminoacetoxy, methoxyacetoxy, phenoxyacetoxy, trimethylacetoxy, propionoxy, β-chloropropionoxy, cyclopentylpropionoxy, phenylpropionoxy, butyroxy, caprooxy, enanthoxy, benzyloxy and hemisuccinyloxy groups, and the like.

As previously indicated, the ester group can also be derived from an inorganic acid such as phosphoric, sulfuric, or the like. Further, water-soluble esters such as the alkali metal salts of hemi-esters, e.g., the sodium salt of the 17α-hemisuccinate, and the like, the alkali metal salts of phosphoric acid esters, e.g., the sodum salt of the 17α-phosphate ester, and the like, and the hydrohalides of amino-acid esters and the like, are also included among the compounds of the present invention.

The novel compounds of the present invention, as represented by Formula I hereinabove, are progestational agents, and where R' is an acyloxy group derived from a hydrocarbon carboxylic acid having less than 12 carbon atoms, e.g., an acetoxy group, they are particularly suited for oral administration. In addition, these compounds of Formula I wherein $R^2$ is methyl, i.e., the compounds of Formula III, exhibit a different degree of anti-estrogenic activity than those wherein $R^2$ is hydrogen, particularly when administered orally.

These compounds can be prepared by processes which can be represented schematically as follows:

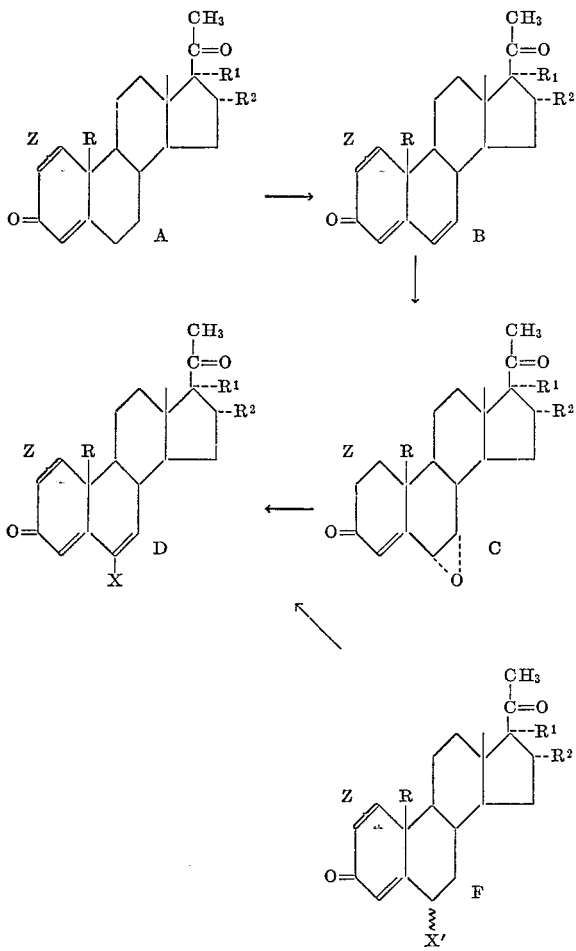

In these formulas R, R', R², X and Z have the same meanings as set forth hereinabove for Formula I and X' represents fluorine or chlorine.

In the process which involves going from a starting material represented by Compound A to a final product, Compound D, as illustrated by the above reaction sequence, A-B-C-D, the first step involves introducing a double bond at the 6(7)-position in said starting material. This dehydrogenation reaction is preferably carried out by dissolving the starting material, e.g., a 17α-acyloxy progesterone such as 19-nor-17α-acetoxyprogesterone (A; R and R²=hydrogen, R'=acetoxy, Z=a saturated linkage) in an inert organic solvent, e.g., a lower alkanol such as t-butanol, n-amyl alcohol, t-amyl alcohol, or the like, an aromatic hydrocarbon such as xylene or the like, or a mixture of acetic acid with ethyl acetate, n-amyl acetate, or the like, and then refluxing with a quinone having an oxidation-reduction potential of less than about −0.5, and preferably one having an oxidation-reduction potential of less than about −0.65, such as chloranil (tetrachloro-p-benzoquinone) and the like, for from about 8–16 hours, preferably under an inert atmosphere, thus giving the corresponding 6-dehydro steroid, e.g., 6-dehydro-19-nor-17α-acetoxyprogesterone (B; R and R²=hydrogen, R'=acetoxy).

This 6-dehydro compound is then epoxidized to give the corresponding 6α,7α-oxido intermediate, e.g., 6α,7α-oxido-19-nor-17α-acetoxyprogesterone (C; R and R²=hydrogen, R'=acetoxy, Z=a saturated linkage). This reaction can be carried out by dissolving the 6-dehydro compound and a peracid, e.g., perbenzoic acid, monoperphthalic acid, or the like, preferably in excess, in an inert organic solvent e.g. a chlorinated hydrocarbon such as methylene chloride chloroform carbon tetrachloride or the like, as well as mixtures thereof with each other e.g., a mixture of carbontetrachloride and chloroform, or with other solvents, e.g., diethyl ether, and allowing this reaction mixture to stand at room temperature (about 25° C.) for about 24 hours.

The corresponding 6-chloro- and 6-bromo-6-dehydro steroids, e.g., 6-chloro-19-nor-Δ⁴,⁶-pregnadien-17α-ol-3,20-dione 17-acetate and 6-bromo-19-nor-Δ⁴,⁶-pregnadien-17α-ol-3,20-dione 17-acetate (D; R and R²=hydrogen, R'=acetoxy, X=chlorine or bromine, Z=a saturated linkage), are prepared from the 6α,7α-oxido intermediates by first suspending said intermediate in a solvent such as glacial acetic acid or the like, and then adding anhydrous hydrogen chloride or bromide, either as a liquid or a gas, thereto. Where the anhydrous hydrogen chloride or bromide is used as a gas, the reaction will generally take place at about room temperature or below, e.g., at from about 15° C. to about 25° C., for from about 2–6 hours. When the reagent is used as a liquid, the reaction will generally be conducted at steam bath temperature for from about 20–60 minutes.

The corresponding 6-fluoro-6-dehydro steroid, e.g., 6-fluoro-19-nor-Δ⁴,⁶-pregnadien-17α-ol-3,20-dione 17-acetate (D; R and R²=hydrogen, R'=acetoxy, X=fluorine, Z=a saturated linkage), can be obtained from the 6α,7α-oxido intermediate by first treating said intermediate, dissolved in an inert organic solvent, e.g., a mixture of equal parts of diethyl ether and benzene, or the like, with a fluorinating agent such as boron trifluoride etherate, or the like, preferably at room temperature overnight, to form the corresponding 6β-fluoro-7α-hydroxy intermediate. Thus, intermediate is then dehydrated, e.g., by suspending it in glacial acetic acid and then passing a current of hydrogen chloride gas through the suspension under the conditions described hereinabove for the preparation of 6-chloro-6-dehydro steroids, to give the corresponding 6-fluoro-6-dehydro steroid.

The thus-obtained 6-fluoro-, 6-chloro- and 6-bromo-6-dehydro steroids of Formula D wherein R=methyl which have a saturated linkage between the carbon atoms at the 1- and 2-positions are readily converted to the corresponding Δ¹,⁴,⁶-pregnatrienes, e.g., 6-fluoro-Δ¹,⁴,⁶-pregnatrien-17α-ol-3,20-dione 17-acetate, 6-chloro-Δ¹,⁴,⁶-pregnatrien 17α-ol-3,20-dione 17-acetate and 6-bromo-Δ¹,⁴,⁶-pregnatrien-17α-ol-3,20-dione 17-acetate (D; R=methyl, R'=acetoxy, R²=hydrogen, X=fluorine, chlorine or bromine, Z=a double bond), by dissolving them in an inert organic solvent, e.g., a lower alkanol such as t-butanol or the like, containing a catalytic amount of pyridine, collidine, or the like, and then refluxing the resulting solution with selenium dioxide under an inert atmosphere for periods of time ranging from about 12 hours up to about 96 hours, and usually for about 48 hours.

Alternatively, a double bond can be introduced into a Δ⁴,⁶-pregnadiene by incubating it in known manner with various microorganisms, e.g., *Corynebacterium simplex*, A.T.C.C. No. 6946, or *Septomyxa affinis*, A.T.C.C. No. 5737. In addition, the initial reaction of Compound A with a quinone such as chloranil, if carried out in the presence of n-amyl alcohol as the solvent, will result in the introduction of a double bond at the 1(2)- as well as the 6(7)-position.

A double bond can also be introduced into a Δ⁴-3-keto pregnene starting material represented by Compound A or F prior to the introduction of the double bond at the 6(7)-position by any of the aforementioned methods, e.g., using selenium dioxide or microbiological dehydrogenation.

In the process which involves going from a starting material represented by Compound F to final product D, as illustrated by the above reaction sequence F–D, the first step involves introducing a double bond at the 6(7)-position in said starting material. This will be accomplished by means of the same reaction as that described hereinabove for going from Compound A to Compound B, i.e., by the use of a quinone such as chloranil or the like, at reflux temperature. Similarly, where the starting material has a saturated linkage between the carbon atoms at the 1- and 2- positions, a double bond can be introduced either simultaneously with or following the introduction of the 6(7)-double bond, in the manner described hereinabove, i.e., by using n-amyl alcohol as the solvent for the reaction with chloranil, or by reacting the $\Delta^{4,6}$-pregnadiene with selenium dioxide or incubating it with various microörganisms.

An alternate route to the above-described 6-chloro-6-dehydro steroids of Formula D can be represented schematically as follows:

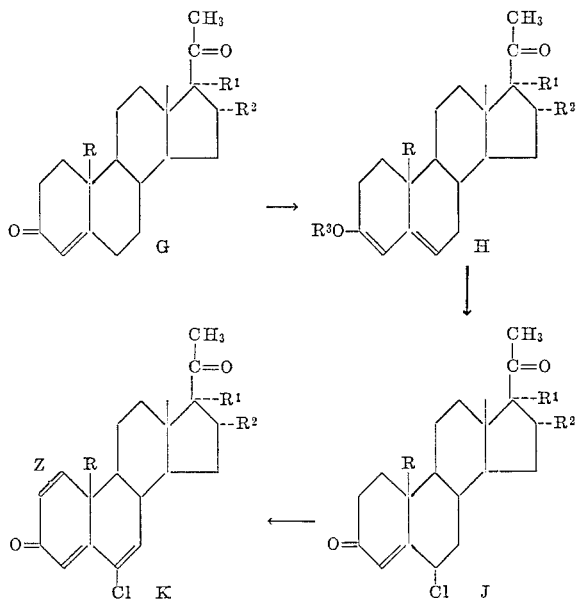

In these formulas R, R', R² and Z have the same meanings as set forth hereinabove for Formula I and R³ represents a lower alkyl group, e.g., ethyl and the like.

The first step of this alternate process involves reacting the starting material, e.g., 17α-acetoxyprogesterone (G; R=methyl, R'=acetoxy, R²=hydrogen), dissolved in an inert organic solvent, such as dioxane, tetrahydrofuran, diethyl ether, or the like, with a lower alkyl orthoformate, e.g., ethyl orthoformate and the like, in the presence of an acidic esterification catalyst such as p-toluenesulfonic acid and the like, preferably at room temperature, to produce the corresponding 3-lower alkyl enol ether, e.g. 3-ethoxy - $\Delta_{3,5}$ - pregnadien-17α-ol-20-one 17-acetate (H; R=methyl, R'=acetoxy, R²=hydrogen, R³=ethyl).

This 3-enol ether, dissolved in an inert organic solvent such as acetone and the like, is then reacted at low temperature, e.g., approximately 0° C., for about 1 hour with an N-chloro amide, e.g., N-chlorosuccinimide or the like, to give the corresponding 6β-chloro-$\Delta^4$-3-keto steroid, e.g., 6β-chloro-17α-acetoxyprogesterone (J; R=methyl, R'=acetoxy, R²=hydrogen).

Double bonds can be introduced at the 6(7)-and/or 1(2)-positions in this 6β-chloro intermediate in the manner described hereinabove, i.e., using chloranil and selenium dioxide or microbiological dehydrogenation.

An illustrative but by no means exhaustive listing of compounds coming within the scope of Formula I hereinabove which can be prepared by the above-described processes includes:

6-fluoro-$\Delta^{4,6}$-pragnadien-17α-ol-3,20-dione,
6-fluoro-$\Delta^{4,6}$-pregnadien-17α-ol-3,20-dione 17-acetate,
6-chloro-$\Delta^{4,6}$-pregnadien-17α-ol-3,20-dione,
6-chloro-$\Delta^{4,6}$-pregnadien-17α-ol-3,20-dione 17-acetate,
6-chloro-$\Delta^{4,6}$-pregnadien-17α-ol-3,20-dione 17 - propionate
6-chloro-$\Delta^{4,6}$-pregnadien-17α-ol-3,20-dione 17-butyrate,
6-chloro-$\Delta^{4,6}$-pregnadien-17α-ol-3,20-dione 17-cyclopentylpropionate,
6-chloro-$\Delta^{4,6}$-pregnadien-17α-ol-3,20-dione 17-caproate,
6-bromo-$\Delta^{4,6}$-pregnadien-17α-ol-3,20-dione,
6-bromo-$\Delta^{4,6}$-pregnadien-17α-ol-3,20-dione 17-acetate,
6-fluoro-16α-methyl-$\Delta^{4,6}$-pregnadien-17α-ol-3,20-dione 17-benzoate,
6-chloro-16α-methyl-$\Delta^{4,6}$-pregnadien-17α-ol-3,20-dione 17-acetate,
6-chloro-16α-methyl-$\Delta^{4,6}$-pregnadien-17α-ol-3,20-dione 17-valerate,
6-bromo-16α-methyl-$\Delta^{4,6}$-pregnadien-17α-ol-3,20-dione 17-acetate,
6-fluoro-19-nor-$\Delta^{4,6}$-pregnadien-17α-ol-3,20-dione 17-acetate,
6-chloro-19-nor-$\Delta^{4,6}$-pregnadien-17α-ol-3,20-dione 17-acetate,
6-chloro-19-nor-$\Delta^{4,6}$-pregnadien-17α-ol-3,20-dione 17-caproate,
6-bromo-19-nor-$\Delta^{4,6}$-pregnadien-17α-ol-3,20-dione 17-caproate,
6-fluoro-$\Delta^{1,4,6}$-pregnatrien-17α-ol-3,20-dione,
6-fluoro-$\Delta^{1,4,6}$-pregnatrien-17α-ol-3,20-dione 17-acetate,
6-chloro-$\Delta^{1,4,6}$-pregnatrien-17α-ol-3,20-dione,
6-chloro-$\Delta^{1,4,6}$-pregnatrien-17α-ol-3,20-dione 17-acetate,
6-chloro-$\Delta^{1,4,6}$-pregnatrien-17α-ol-3,20-dione 17-amino acetate,
6-chloro-$\Delta^{1,4,6}$-pregnatrien-17α-ol-3,20-dione 17-phenylpropionate,
6-bromo-$\Delta^{1,4,6}$-pregnatrien-17α-ol-3,20-dione,
6-bromo-$\Delta^{1,4,6}$-pregnatrien-17α-3,20-dione 17β-chloropropionate,
6-fluoro-16α-methyl-$\Delta^{1,4,6}$-pregnatrien-17α-ol-3,20 - dione 17-acetate,
6-chloro-16α-methyl-$\Delta^{1,4,6}$-pregnatrien-17α-ol-3,20 - dione 17-acetate,
6-bromo-16α-methyl-$\Delta^{1,4,6}$-pregnatrien-17α-ol-3,20 - dione 17-acetate,
and the like.

In order that those skilled in the art can more fully understand the present invention, the following examples are set forth. These examples are given solely for the purpose of illustrating the invention, and should not be considered as expressing limitations unless so set forth in the appended claims.

EXAMPLE I

A mixture of 5 grams of 19-nor-17α-acetoxyprogesterone, 10 grams of chloranil and 200 cc. of t-butanol was refluxed for 10 hours. Following this reaction period the mixture was cooled and the excess of chloranil filtered off and washed with a large volume of ethyl acetate. These washings were added to the filtrate, and the combined organic solution was washed with a cold, aqueous 10% sodium hydroxide solution until the washings were colorless. The organic layer (chiefly ethyl acetate, containing the product) was then dried over anhydrous sodium sulfate and evaporated to dryness. Recrystallization from methylene chloride/diethyl ether gave 19-nor-$\Delta^{4,6}$-pregnadien-17α-ol-3,20-dione 17-acetate.

By repeating this procedure in every detail but one, namely, replacing 19-nor-17α-acetoxyprogesterone with 17α-acetoxyprogesterone, the corresponding 6 - dehydro steroid, i.e., $\Delta^{4,6}$-pregnadien-17α-ol-3,20-dione, was obtained.

EXAMPLE II

A solution of 4 grams of the thus-obtained 19-nor-$\Delta^{4,6}$-pregnadien-17α-ol-3,20-dione 17-acetate in 100 cc. of chloroform was cooled to 0° C. and then admixed with 4 molar equivalents of monoperphthalic acid dissolved in diethyl ether. The resulting reaction mixture was held at room temperature for 20 hours, following which it was diluted with water. Next, the organic layer was separated, washed with an aqueous sodium bicarbonate solution and then with water until neutral, then dried over anhydrous sodium sulfate and finally evaporated to dryness. Recrystallization of the dry residue from acetone/hexane gave 6α,7α-oxido-19 - nor - Δ⁴ - pregnen - 17α - ol - 3,20 - dione 17-acetate.

This procedure was then repeated in every detail but one, namely, $\Delta^{4,6}$-pregnadien-17α-ol-3,20-dione 17-acetate was used as the starting steroid, thus giving 6α,7α-oxido-$\Delta^4$-pregnen-17α-ol-3,20-dione 17-acetate.

EXAMPLE III

One gram of the thus-obtained 6α,7α-oxido-19-nor-$\Delta^4$-pregnen-17α-ol-3,20-dione 17-acetate was suspended in 35 cc. of glacial acetic acid. Next, a slow current of anhydrous hydrogen chloride gas was passed through the suspension, and in 10 minutes all the solid matter present had dissolved. The passage of the gas was continued for a total of 5 hours, following which the solution was concentrated to about one-third of its initial volume by distillation under reduced pressure at 35° C., and then poured into ice water. The precipitate formed thereby was collected by filtration, washed with water until neutral, and then dried. Recrystallization from methylene chloride/hexane gave 6 - chloro - 19 - nor-$\Delta^{4,6}$-pregnadien-17α-ol-3,20-dione 17-acetate.

By repeating this procedure in every detail with one exception, namely, replacing the anhydrous hydrogen chloride gas with anhydrous hydrogen bromide gas, the corresponding 6-bromo-6-dihydro steroid, i.e., 6-bromo-19-nor-$\Delta^{4,6}$-pregnadien-17α-ol-3,20-dione 17-acetate, was obtained.

Similarly, by replacing the starting steroid with 6α,7α-oxido-$\Delta^4$-pregnen-17α-ol-3,20-dione 17-acetate and the anhydrous hydrogen chloride gas with anhydrous hydrogen bromide gas, keeping all other factors the same, 6-bromo-$\Delta^{4,6}$-pregnadien-17α-ol-3,20-dione 17-acetate was obtained.

EXAMPLE IV

A solution of 1 gram of 6α,7α-oxido-19-nor-$\Delta^{4,6}$-pregnadien-17α-ol-3,20-dione 17-acetate in a mixed solvent consisting of 25 cc. of benzene and 25 cc. of diethyl ether was admixed with 5 cc. of freshly distilled boron trifluoride etherate. The resulting reaction mixture was allowed to stand at room temperature overnight, following which it was diluted with water. The organic layer was separated, washed with water, dried over anhydrous sodium sulfate and evaporated to dryness under vacuum. The dry product was found to be 6β-fluoro-19-nor-$\Delta^4$-pregnene-7α,17-diol-3,20-dione 17-acetate.

This 6β-fluoro-7α-hydroxy intermediate was suspended in 35 cc. of glacial acetic acid, and a slow current of anhydrous hydrogen chloride was passed through this suspension for 4 hours. Following this reaction period the product was worked up in the manner described in Example III above, thus yielding 6-fluoro-19-nor-$\Delta^{4,6}$-pregnadien-17α-ol-3,20-dione 17-acetate.

EXAMPLE V

A mixture of 5 grams of 6α-chloro-17α-acetoxy-progesterone, 10 grams of chloranil, 125 cc. of ethyl acetate and 25 cc. of acetic acid was refluxed for 55 hours under an inert nitrogen atmosphere. Following this reaction period the mixture was cooled, washed with an aqueous 10% sodium hydroxide solution until the washings were colorless, and then with water until neutral. The resulting neutral solution was dried over anhydrous sodium sulfate and evaporated at reduced pressure. Chromatographic purification on neutral alumina gave 6-chloro-$\Delta^{4,6}$-pregnadien-17α-ol-3,20-dione 17-acetate, which after one crystallization from acetone/diethyl ether, melted at 210–211° C.; $[\alpha]_D + 8°$ (chloroform);

$$\lambda_{max.}^{EtOH}\ 284\text{–}286\ m\mu,\ \log\ \epsilon\ 4.30$$

By repeating this procedure in every detail but one, namely, replacing 6α-chloro-17α-acetoxyprogesterone with 6β-chloro-17α-acetoxyprogesterone, 6α-fluoro - 17α - acetoxyprogesterone and 6α - fluoro-17α-acetoxy-1-dihydroprogesterone, respectively, the corresponding 6-dehydro steroids, namely, 6 - chloro-$\Delta^{4,6}$-pregnadien-17α-ol-3,20-dione 17-acetate (identical with that prepared from 6α-chloro - 17α - acetoxyprogesterone), 6-fluoro-$\Delta^{4,6}$-pregnadiene-17α-ol-3,20-dione 17-acetate and 6 - fluoro - $\Delta^{1,4,6}$-pregnatrien-17α-ol - 3,20 - dione 17-acetate, respectively, were obtained.

EXAMPLE VI

A mixture of 2 grams of 6-chloro-$\Delta^{4,6}$-pregnadien-17α-ol-3,20-dione 17-acetate, 100 cc. of t-butanol, 600 mg. of freshly sublimed selenium dioxide and 0.2 cc. of pyridine was refluxed for 48 hours under an inert nitrogen atmosphere. Following this reaction period the reaction mixture was filtered, while hot, through Celite, and the filtrate was then evaporated to dryness. The resulting dry residue was decolorized by dissolving it in acetone and refluxing the resulting solution with decolorizing charcoal for 1 hour. The acetone was then evaporated and the product was purified by chromatography on neutral alumina, thus giving 6-chloro-$\Delta^{1,4,6}$-pregnatrien-17α-ol-3,20-dione 17-acetate.

By repeating this procedure in every detail but one, namely, by replacing 6-chloro-$\Delta^{4,6}$-pregnadien-17α-ol-3,20-dione 17-acetate with 6-bromo-$\Delta^{4,6}$-pregnadien-17α-ol-3,20-dione 17-acetate and 6-fluoro-$\Delta^{4,6}$-pregnadien-17α-ol-3,20-dione 17-acetate, respectively, the corresponding 1-dehydro steroids, namely, 6-bromo-$\Delta^{1,4,6}$-pregnatrien-17α-ol-3,20-dione 17-acetate and 6-fluoro-$\Delta^{1,4,6}$-pregnatrien-17α-ol- 3,20-dione respectively, were obtained.

EXAMPLE VII

A solution of 1 gram of 6-chloro-$\Delta^{4,6}$-pregnadien-17α-ol-3,20-dione 17-acetate in 100 cc. of methanol was refluxed for 1 hour with 0.5 gram of potassium hydroxide. Following this reaction period the solution was neutralized by adding acetic acid thereto, and then was concentrated to a small volume and poured into 500 cc. of water. The thus-formed precipitate was collected by filtration and then crystallized from acetone/ether to give 6-chloro-$\Delta^{4,6}$-pregnadien-17α-ol-3,20-dione.

By repeating this procedure in every detail but one, namely, replacing 6-chloro-$\Delta^{4,6}$-pregnadien-17α-ol-3,20-dione 17-acetate with 6-fluoro-$\Delta^{4,6}$-pregnadien-17α-ol-3,20-dione 17-acetate, 6-bromo-$\Delta^{4,6}$-pregnadien-17α-ol-3,20-dione 17-acetate, 6-fluoro-$\Delta^{1,4,6}$-pregnatrien-17α-ol-3,20-dione 17-acetate, 6-chloro-$\Delta^{1,4,6}$-pregnatrien-17α-ol-3,20-dione 17-acetate and 6-bromo-$\Delta^{1,4,6}$-pregnatrien-17α-ol-3,20-dione 17-acetate, respectively, the corresponding 17α-free hydroxy steroids, namely, 6-fluoro-$\Delta^{4,6}$-pregnadien-17α-ol-3,20-dione, 6-bromo-$\Delta^{4,6}$-pregnadien-17α-ol-3,20-dione, 6-fluoro-$\Delta^{1,4,6}$-pregnatrien-17α-ol-3,20-dione, 6-chloro-$\Delta^{1,4,6}$-pregnatrien-17α-ol-3,20-dione and 6-bromo-$\Delta^{1,4,6}$-pregnatrien-17α-ol-3,20-dione, respectively, were obtained.

All of the free 17α-hydroxy-steroids obtained in this example could be re-esterified by conventional acylation with an acid anhydride in the presence of p-toluenesulfonic acid.

EXAMPLE VIII

A mixture of 5 grams of 17α-acetoxy-19-norprogesterone, 100 cc. of dioxane, 5 cc. of ethyl orthoformate and 100 mg. of p-toluenesulfonic acid was stirred at room temperature for 40 minutes. Following this reaction period the mixture was treated with 6 cc. of pyridine and then with 400 cc. of water. The product was then extracted with ethyl acetate and the resulting extract was washed with water, dried over anhydrous sodium sulfate and then evaporated to dryness, thus giving 3-ethoxy-17α-acetoxy-19-nor-$\Delta^{3,5}$-pregnadien-20-one.

A mixture of 4 grams of the thus-obtained 3-ethoxy-$\Delta^{3,5}$-intermediate, 80 cc. of acetone, 16 cc. of water and 1.6 g. of sodium acetate was cooled to 0° C. and then treated with 1.6 grams of N-chlorosuccinimide followed by 1.6 cc. of glacial acetic acid. The resulting reaction mixture was stirred at 0° C. for 1 hour, following which it was poured into water. The precipitate formed thereby was collected by filtration, dried and then recrystallized from diethyl ether, thus yielding 6$\beta$-chloro-17$\alpha$-acetoxy-19-norprogesterone.

Treatment of the thus-obtained 6$\beta$-chloro intermediate with chloranil in the manner described in Example V above gave 6-chloro-19-nor-$\Delta^{4,6}$-pregnadien-17$\alpha$-ol-3,20-dione 17-acetate, identical with the product of Example III.

By repeating this procedure in every detail but one, namely, replacing 17$\alpha$-acetoxy-19-norprogesterone with 17$\alpha$-acetoxyprogesterone, the corresponding 6-chloro-6-dehydro-derivative, namely, 6-chloro-$\Delta^{4,6}$-pregnadien-17$\alpha$-ol-3,20-dione 17-acetate, identical with the product of Example V, was obtained.

EXAMPLE IX

A mixture of 1 gram of 6$\alpha$-fluoro-16$\alpha$-methyl-17$\alpha$-acetoxyprogesterone, 10 grams of chloranil, 100 cc. of n-amyl acetate and 10 cc. of glacial acetic acid was refluxed under an atmosphere of nitrogen for 16 hours. Following this reaction period the mixture was cooled, then washed with an ice cold aqueous 5% sodium hydroxide solution until the washings were colorless, and then with water until neutral. Next, the neutral solution was dried over anhydrous sodium sulfate, and the solvent was then evaporated therefrom under reduced pressure. Recrystallization of the resulting residue from acetone/hexane gave 6-fluoro-16$\alpha$-methyl-$\Delta^{4,6}$-pregnadien-17$\alpha$-ol-3,20-dione 17-acetate.

A mixture of 3 grams of the thus-obtained $\Delta^{4,6}$-pregnadiene, 150 cc. of t-butanol, 1.8 grams of selenium dioxide and a few drops of pyridine was refluxed under an inert nitrogen atmosphere for 24 hours, following which it was filtered through Celite while hot. Next, the filtrate was evaporated to dryness under reduced pressure, and the resulting residue was decolorized by refluxing it with 100 cc. of acetone and 3 grams of decolorizing charcoal and then evaporated. The crude product obtained after evaporation was purified by chromatography on neutral alummina, thus giving 6-fluoro-16$\alpha$-methyl-$\Delta^{1,4,6}$-pregnatrien-17$\alpha$-ol-3,20-dione 17-acetate.

This procedure was repeated in every detail but one, namely, ethyl acetate was substituted for n-amyl acetate in the first stage. The same compound, namely, 6-fluoro-16$\alpha$-methyl-$\Delta^{4,6}$-pregnadien - 17$\alpha$ - ol - 3,20 - dione 17-acetate, was obtained in this stage, and was subsequently converted to 6-fluoro - 16$\alpha$ - methyl - $\Delta^{1,4,6}$ - pregnatrien-17$\alpha$-ol-3,20-dione 17-acetate.

Similarly, by repeating the entire procedure using 6$\alpha$-chloro - 16$\alpha$ - methyl - 17$\alpha$ - acetoxyprogesterone as the starting material, 6-chloro-16$\alpha$-methyl-$\Delta^{4,6}$-pregnadien-17$\alpha$-ol-3,20 - dione 17 - acetate and then 6-chloro-16$\alpha$-methyl-$\Delta^{1,4,6}$-pregnatrien - 17$\alpha$-ol-3,20-dione 17 - acetate were obtained.

EXAMPLE X

A mixture of 5 grams of 6$\alpha$-fluoro-16$\alpha$-methyl-$\Delta^{1,4}$-pregnadien-17$\alpha$-ol-3.20-dione 17-acetate, 10 grams of chloranil and 100 cc. of t-amyl alcohol was refluxed under an inert nitrogen atmosphere for 48 hours. Following this reaction period the mixture was evaporated to dryness and the residue was extracted with 500 cc. of methylene chloride. Next, the extract was washed with cold aqueous 5% sodium hydroxide solution until the washings were colorless and then with water until neutral. The neutral extract was then dried over anhydrous sodium sulfate, and the solvent was then evaporated therefrom under reduced pressure. Recrystallization of the resulting residue from acetone/hexane gave 6-fluoro-16$\alpha$-methyl - $\Delta^{1,4,6}$ - pregnatrien - 17$\alpha$ - ol - 3,20 - dione 17-acetate, the properties of which were identical with those of the final product of Example IX.

By repeating this procedure in every detail but one, namely, replacing 6$\alpha$ - fluoro-16$\alpha$-methyl-$\Delta^{1,4}$-pregnadien-17$\alpha$-ol-3,20-dione 17-acetate with 6$\alpha$-chloro-16$\alpha$-methyl-$\Delta^{1,4}$-pregnadien-17$\alpha$-ol-3,20-dione 17-acetate and 16$\alpha$-methyl-17$\alpha$-acetoxyprogesterone, respectively, there were obtained 6-chloro-16$\alpha$-methyl-$\Delta^{1,4,6}$-pregnatrien - 17$\alpha$ - ol-3,20-dione 17-acetate and 16$\alpha$-methyl-$\Delta^{4,6}$-pregnadien-17$\alpha$-ol-3,20-dione 17-acetate, respectively. Further treatment of the latter compound with selenium dioxide in t-butanol containing pyridine as a catalyst, under an inert nitrogen atmosphere, as described in Example IX, gave 16$\alpha$ - methyl - $\Delta^{1,4,6}$ - pregnatrien - 17$\alpha$ - ol - 3,20 - dione 17-acetate.

EXAMPLE XI

A solution of 4 grams of 16$\alpha$-methyl-$\Delta^{4,6}$-pregnadien-17$\alpha$-ol-3,20-dione 17- acetate, 200 cc. of methylene chloride and 130 cc. of a 5% diethyl ether solution of monoperphthalic acid was kept at room temperature for 24 hours. Following this reaction period the reaction mixture was washed with an aqueous 5% sodium carbonate solution and then with water. Next, the solution was dried over anhydrous sodium sulfate and then concentrated until crystallization began. The solution was then cooled and the resulting precipitate was collected by filtration, washed with water, and then air-dried. Chromatography on neutral alumina afforded 16$\alpha$-methyl-6$\alpha$,7$\alpha$-oxido-$\Delta^4$-pregnen-17$\alpha$-ol-3,0-dione 17-acetate.

Two grams of the thus-obtained 6$\alpha$,7$\alpha$-oxido intermediate were dissolved in 100 cc. of glacial acetic acid. Next, a slow stream of anhydrous hydrogen bromide was passed through this solution for 1 hour, with the temperature being maintained at 15° C. during this time. Following this reaction period, the reaction mixture was poured into ice water and the resulting precipitate was collected, washed with water, dried under vacuum and then purified by chromatography on neutral alumina, thus giving 6-bromo-16$\alpha$-methyl-$\Delta^{4,6}$-pregnadien-17$\alpha$-ol-3,20-dione 17-acetate.

One gram of this 6-bromo-6-dehydro steroid was refluxed with selenium dioxide in t-butanol containing pyridine, under inert nitrogen atmosphere, in the manner described in Example IX, to give 6-bromo-16$\alpha$-methyl-$\Delta^{1,4,6}$ - pregnatrien - 17$\alpha$ - ol - 3,20 - dione 17-acetate.

By reacting the 6$\alpha$,7$\alpha$-oxido intermediate, dissolved in glacial acetic acid, with a slow stream of anhydrous hydrogen chloride for 2 hours at 15° C., and then following the remainder of the above-described procedure in every detail, 6 - chloro - 16$\alpha$-methyl-$\Delta^{4,6}$-pregnadien-17$\alpha$-ol-3,20-dione 17-acetate and 6-chloro-16$\alpha$-methyl-$\Delta^{1,4,6}$-pregnatrien-17$\alpha$-ol-3,20-dione 17 - acetate, respectively, were obtained.

Similarly, by replacing 16$\alpha$ - methyl-$\Delta^{4,6}$-pregnadien-17$\alpha$-ol-3,20-dione 17-acetate with 16$\alpha$ - methyl-$\Delta^{1,4,6}$-pregnatrien-17$\alpha$-ol-3,20-dione 17-acetate, preparing the corresponding 6$\alpha$,7$\alpha$-oxido intermediate therefrom, and then reacting this epoxide with anhydrous hydrogen chloride gas and anhydrous hydrogen bromide gas in the manner described hereinabove, the corresponding 6-chloro- and 6 - bromo - derivatives, i.e., 6-chloro-16$\alpha$-methyl - $\Delta^{1,4,6}$ - pregnatrien - 17$\alpha$ - ol - 3,20 - dione 17-acetate and 6 - bromo - 16$\alpha$ - methyl - $\Delta^{1,4,6}$-pregnatrien-17$\alpha$-ol-3,20-dione 17-acetate, were obtained.

It will be obvious to those skilled in the art that other changes and variations can be made in carrying out the present invention without departing from the spirit and scope thereof as defined in the appended claims.

We claim:
1. A compound represented by the general formula:

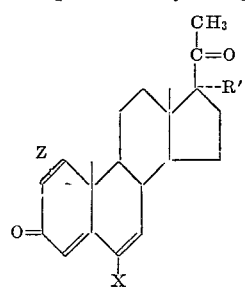

wherein R' is selected from the group consisting of a hydroxyl group and a hydrocarbon carboxylic acyloxy group having less than 12 carbon atoms, X is selected from the group consisting of fluorine, chlorine, and bromine, and Z is selected from the group consisting of a saturated linkage and a double bond.

2. 6-fluoro-$\Delta^{4,6}$-pregnadien-17α-ol-3,20-dione.
3. 6-fluoro-$\Delta^{4,6}$-pregnadien-17α-ol-3,20-dione 17-acetate.
4. 6-chloro-$\Delta^{4,6}$-pregnadien-17α-ol-3,20-dione.
5. 6-chloro-$\Delta^{4,6}$-pregnadien-17α-ol-3,20-dione 17-acetate.
6. 6-bromo-$\Delta^{4,6}$-pregnadien-17α-ol-3,20-dione.
7. 6-bromo-$\Delta^{4,6}$-pregnadien-17α-ol-3,20-dione 17-acetate.
8. 6-fluoro-$\Delta^{1,4,6}$-pregnatrien-17α-ol-3,20-dione.
9. 6-fluoro-$\Delta^{1,4,6}$-pregnatrien-17α-ol-3,20-dione 17-acetate.
10. 6-chloro-$\Delta^{1,4,6}$-pregnatrien-17α-ol-3,20-dione.
11. 6-chloro-$\Delta^{1,4,6}$-pregnatrien-17α-ol-3,20-dione 17-acetate.
12. 6-bromo-$\Delta^{1,4,6}$-pregnatrien-17α-ol-3,20-dione.
13. 6-bromo-$\Delta^{1,4,6}$-pregnatrien-17α-ol-3,20-dione 17-acetate.
14. A compound represented by the general formula:

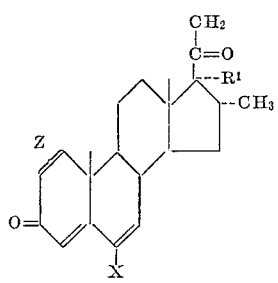

wherein R' is a hydrocarbon carboxylic acyloxy group having less than 12 carbon atoms, X is selected from the group consisting of fluorine, chlorine and bromine, and Z is selected from the group consisting of a saturated linkage and a double bond.

15. 6-fluoro-16α-methyl-$\Delta^{4,6}$-pregnadien-17α-ol-3,20-dione 17-acetate.
16. 6-chloro-16α-methyl-$\Delta^{4,6}$-pregnadien-17α-ol-3,20-dione 17-acetate.
17. 6-bromo-16α-methyl-$\Delta^{4,6}$-prognadien-17α-ol-3-20-dione 17-acetate.
18. 6-fluoro-16α-methyl-$\Delta^{1,4,6}$-pregnatrien-17α-ol-3,20-dione 17-acetate.
19. 6-chloro-16α-methyl-$\Delta^{1,4,6}$-pregnatrien 17α-ol-3,20-dione 17-acetate.
20. 6-bromo-16α-methyl-$\Delta^{1,4,6}$-pregnatrien-17α-ol-3,20-dione 17-acetate.
21. A compound represented by the general formula:

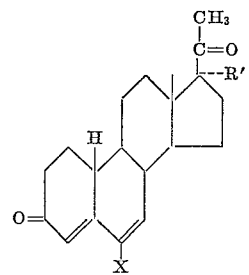

wherein R' is a hydrocarbon carboxylic acyloxy group having less than 12 carbon atoms and X is selected from the group consisting of fluorine, chlorine and bromine.

22. 6-fluoro-19-nor-$\Delta^{4,6}$-pregnadien-17α-ol-3,20-dione 17-acetate.
23. 6-chloro-19-nor-$\Delta^{4,6}$-pregnadien-17α-ol-3,20-dione 17-acetate.
24. 6-bromo-19-nor-$\Delta^{4,6}$-pregnadien-17α-ol-3,20-dione 17-acetate.
25. A compound of the formula:

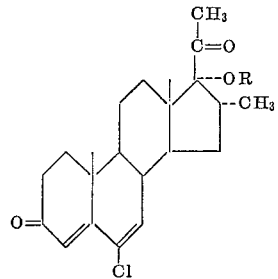

wherein R is lower alkanoyl.

26. $\Delta^{4,6}$-3:20-dioxo-17α-acetoxy-19-nor-pregnadiene.
27. $\Delta^{4,6}$-3:20-dioxo-17α-caproyloxy-19-nor-pregnadiene.
28. Esters of $\Delta^{4,6}$-3:20-dioxo-17α-hydroxy-19-nor-pregnadiene derived from carboxylic acids having up to 15 carbon atoms.

References Cited
UNITED STATES PATENTS
3,250,792   5/1966   Wettstein et al.

HENRY A. FRENCH, Primary Examiner

U.S. Cl. X.R.
195—51; 260—239.55, 999